(12) United States Patent
Raman et al.

(10) Patent No.: US 9,621,650 B2
(45) Date of Patent: Apr. 11, 2017

(54) MOBILE APPLICATION STATE IDENTIFIER FRAMEWORK

(71) Applicant: GOOGLE INC., Mountain View, CA (US)

(72) Inventors: Tiruvilwamalai Venkat Raman, San Jose, CA (US); Chengling Chan, Burlingame, CA (US); Mukarram Tariq, Los Gatos, CA (US); Stefan Lafon, Sunnyvale, CA (US)

(73) Assignee: Google Inc, Mountain View, CA (US)

( * ) Notice: Subject to any disclaimer, the term of this patent is extended or adjusted under 35 U.S.C. 154(b) by 0 days.

(21) Appl. No.: 14/501,669

(22) Filed: Sep. 30, 2014

(65) Prior Publication Data

US 2016/0094654 A1 Mar. 31, 2016

(51) Int. Cl.

| | |
|---|---|
| *G06F 9/46* | (2006.01) |
| *H04L 29/08* | (2006.01) |
| *H04W 4/00* | (2009.01) |
| *G06F 3/0484* | (2013.01) |
| *G06F 17/30* | (2006.01) |
| *G06K 9/00* | (2006.01) |
| *G06F 9/48* | (2006.01) |

(52) U.S. Cl.
CPC ...... *H04L 67/1095* (2013.01); *G06F 3/04842* (2013.01); *G06F 3/04847* (2013.01); *G06F 9/461* (2013.01); *G06F 9/4862* (2013.01); *G06F 17/30268* (2013.01); *G06K 9/00496* (2013.01); *H04W 4/003* (2013.01)

(58) Field of Classification Search
CPC ...................................................... G06F 9/461
USPC ......................................................... 715/733
See application file for complete search history.

(56) References Cited

U.S. PATENT DOCUMENTS

| | | | |
|---|---|---|---|
| 6,332,199 B1 * | 12/2001 | Meth et al. ...................... 714/13 |
| 6,353,448 B1 * | 3/2002 | Scarborough et al. ....... 715/744 |
| 6,917,963 B1 * | 7/2005 | Hipp et al. .................... 709/204 |
| 7,969,933 B2 | 6/2011 | Khijniak et al. | |

(Continued)

OTHER PUBLICATIONS

Authoritative Dictionary of IEEE Standards Terms, 7th Ed. IEEE Press, Dec. 2000. Entries for "application" and "task".*

(Continued)

*Primary Examiner* — Patrick Ramsey
(74) *Attorney, Agent, or Firm* — Brake Hughes Bellermann LLP

(57) ABSTRACT

Systems and methods are provided for sharing or recreating a state from a mobile device. For example, a mobile application state identifier can include a protocol identifier, a target task component associated with a mobile application executing when the application state identifier is generated and a sub-task component related to a user-interface active in the mobile application when the application state identifier is generated. The application state identifier can also include a user input component reflecting actions taken by a user during execution of the mobile application. A method can include generating, on a first mobile device, an application state identifier and transmitting the application state identifier to a second mobile device, wherein the second mobile device opens a mobile application associated with the target task to a user-interface corresponding to the sub-task component in response to receiving the application state identifier.

21 Claims, 7 Drawing Sheets

```
200
    asi://maps?directions#s=currentLoc,d=[301 Maple]@57s2yg
    205   210   215           220              225

201
    asi://calendar/date=today?{expand}{click}
    205   210   215        220

202
    astp://{target=Restaurant : parm=search : userInput=Pizza : currLoc=115-412}
    205            210              215              220              225
```

(56) References Cited

U.S. PATENT DOCUMENTS

| | | | |
|---|---|---|---|
| 8,171,137 B1* | 5/2012 | Parks et al. | 709/224 |
| 8,224,894 B1* | 7/2012 | Parks et al. | 709/203 |
| 8,244,043 B2* | 8/2012 | Chang et al. | 382/218 |
| 8,386,563 B2* | 2/2013 | Parks et al. | 709/203 |
| 8,407,605 B2* | 3/2013 | Go et al. | 715/753 |
| 8,473,949 B2* | 6/2013 | Horvitz et al. | 718/100 |
| 8,478,816 B2* | 7/2013 | Parks et al. | 709/203 |
| 8,494,439 B2* | 7/2013 | Faenger | 455/3.06 |
| 8,631,125 B2* | 1/2014 | Lemus | 709/224 |
| 8,635,254 B2 | 1/2014 | Harvey et al. | |
| 8,805,089 B2* | 8/2014 | Chang et al. | 382/218 |
| 8,812,601 B2* | 8/2014 | Hsieh et al. | 709/206 |
| 2005/0278419 A1* | 12/2005 | Morris | 709/203 |
| 2008/0178148 A1* | 7/2008 | Enyeart et al. | 717/109 |
| 2009/0034495 A1* | 2/2009 | Khijniak et al. | 370/338 |
| 2009/0183027 A1* | 7/2009 | Subhraveti | 714/13 |
| 2009/0204966 A1* | 8/2009 | Johnson | G06F 9/4856 |
| | | | 718/100 |
| 2010/0094976 A1* | 4/2010 | Kanefsky et al. | 709/219 |
| 2010/0257450 A1* | 10/2010 | Go et al. | 715/733 |
| 2010/0262589 A1 | 10/2010 | Gnech et al. | |
| 2011/0151979 A1 | 6/2011 | Boesen et al. | |
| 2011/0275358 A1* | 11/2011 | Faenger | 455/420 |
| 2011/0276884 A1* | 11/2011 | Marcjan et al. | 715/733 |
| 2011/0283296 A1* | 11/2011 | Chun | 719/318 |
| 2012/0069199 A1* | 3/2012 | Chang et al. | 348/207.1 |
| 2012/0070090 A1* | 3/2012 | Chang et al. | 382/218 |
| 2012/0191840 A1* | 7/2012 | Gordon | 709/223 |
| 2012/0216102 A1* | 8/2012 | Malla | 715/206 |
| 2012/0266102 A1* | 10/2012 | Dempski et al. | 715/781 |
| 2012/0290657 A1* | 11/2012 | Parks et al. | 709/204 |
| 2012/0290663 A1* | 11/2012 | Hsieh et al. | 709/206 |
| 2012/0290669 A1* | 11/2012 | Parks | H04W 4/008 |
| | | | 709/206 |
| 2012/0322470 A1* | 12/2012 | Said | G06Q 10/107 |
| | | | 455/466 |
| 2013/0041790 A1* | 2/2013 | Murugesan et al. | 705/30 |
| 2013/0054775 A1* | 2/2013 | Lemus | 709/224 |
| 2013/0080785 A1* | 3/2013 | Ruhlen et al. | 713/176 |
| 2013/0173699 A1* | 7/2013 | Parks et al. | 709/203 |
| 2013/0185383 A1* | 7/2013 | Anderson | H04W 4/001 |
| | | | 709/217 |
| 2013/0262385 A1* | 10/2013 | Kumarasamy et al. | 707/634 |
| 2013/0310018 A1* | 11/2013 | Faenger | 455/420 |
| 2013/0325967 A1* | 12/2013 | Parks et al. | 709/204 |
| 2013/0332846 A1* | 12/2013 | Freedman | 715/745 |
| 2014/0074923 A1* | 3/2014 | Vasudevan et al. | 709/204 |
| 2014/0082136 A1* | 3/2014 | Garcia Puga et al. | 709/217 |
| 2014/0108506 A1* | 4/2014 | Borzycki et al. | 709/203 |
| 2014/0173447 A1* | 6/2014 | Das | 715/738 |
| 2014/0189055 A1* | 7/2014 | Etchegoyen | H04L 67/1097 |
| | | | 709/217 |
| 2014/0208233 A1* | 7/2014 | Deeter et al. | 715/753 |
| 2014/0229849 A1* | 8/2014 | Singh et al. | 715/745 |
| 2014/0244715 A1* | 8/2014 | Hodges et al. | 709/203 |
| 2014/0244739 A1* | 8/2014 | Gardenfors et al. | 709/204 |
| 2014/0258357 A1* | 9/2014 | Singh | H04L 67/10 |
| | | | 709/201 |
| 2014/0277616 A1* | 9/2014 | Nixon et al. | 700/83 |
| 2014/0282015 A1* | 9/2014 | Nixon et al. | 715/733 |
| 2014/0289333 A1* | 9/2014 | Chan et al. | 709/204 |
| 2014/0289347 A1* | 9/2014 | Virani et al. | 709/206 |
| 2014/0359637 A1* | 12/2014 | Yan | G06F 9/4881 |
| | | | 718/108 |
| 2014/0366038 A1* | 12/2014 | McKeown et al. | 718/108 |
| 2015/0039579 A1* | 2/2015 | Clark et al. | 707/706 |

OTHER PUBLICATIONS

"Application" and "Task" entries from Merriam-Webster.com, retrieved Sep. 9, 2015 from www.merriam-webster.com.*

International Search Report and Written Opinion received for PCT Patent Application No. PCT/US2015/052630, mailed on Dec. 7, 2015, 11 pages.

* cited by examiner 200 asi://maps?directions#s=currentLoc,d=[301 Maple]@57s2yg
 205  210       215                         220         225

201 asi://calendar/date=today?{expand}{click}
 205  210       215                220

202 astp://{target=Restaurant : parm=search : userInput=Pizza : currLoc=115-412}
 205  210                       215                220                  225

FIG. 2

MOBILE APPLICATION STATE IDENTIFIER FRAMEWORK

BACKGROUND

Users today often use multiple mobile computing devices, as it is not uncommon for a user to have a smartphone and one or more tablets. Users also often communicate with others using mobile devices. In a browser-based computing environment, common on laptops and desktops, a user can perform a task via a web browser and can share the task state as a uniform resource locator (URL). The receiving user can typically click on the URL and see exactly what the sharing user sees. But because mobile computing devices operate in a closed environment, where most tasks are not browser-based, sharing a task state is limited to tasks using a mobile web browser, e.g., using a URL. Thus, a majority of the tasks performed in a mobile environment cannot be shared.

SUMMARY

Implementations provide a mobile application state identifier that enables a user to share a mobile device state across mobile devices, or to recall a previous state at a later time. Sharing a state helps reduce user actions needed to accomplish a task or arrive at a particular state. The mobile application state identifier can include a target task as a first component, which identifies the type of mobile application running when the state identifier is generated. Using a target task rather than a mobile application identifier allows the state to be shared with a device that does not have the specific mobile application installed. The second component of the application state identifier can identify a sub-task within the target task. The sub-task component is dependent on the target task, and may represent common data items the target task deals with or a common user-interface component for the target task. In some implementations, a third component of the application state identifier may identify user input used to achieve the state or user-specific parameters generated by the mobile application. The user input component may include general input and application-specific input, and is optional. The application state identifier may also encode other information used to recreate the state of one mobile device on another mobile device. For example, the application state identifier may encode the location, device pose, font preferences, screen brightness, screen orientation, etc.

In some implementations, the application state identifier has a hierarchical structure, so that various states can be clustered based on the application state identifier. Furthermore, each component may be structured so that more general data items appear ahead of more device or user specific data items.

According to certain aspects of the disclosure, a mobile device includes an application state data store, at least one processor, an executing mobile application, and memory storing instructions that, when executed by the at least one processor, cause the mobile device to perform operations. The operations may include generating an application state identifier that represents a state of the mobile device, the application state identifier including a target task component associated with the mobile application and a sub-task component related to a user-interface active in the mobile application at the time the application state identifier is generated. The operations may also include storing the application state identifier in the application state data store, receiving an indication from the user selecting the application state identifier after exiting the mobile application, and activating the state represented by the application state identifier, including opening the mobile application to the user-interface.

According to certain aspects of the disclosure, a method includes generating, on a first mobile device, an application state identifier. The application state identifier can include a target task component associated with a mobile application executing on the mobile device at the time of the generating and a sub-task component related to a user-interface component active in the mobile application at the time of the generating. The method may also include transmitting the application state identifier to a second mobile device, wherein the second mobile device opens a mobile application associated with the target task to a user-interface corresponding to the sub-task component in response to receiving the application state identifier.

According to certain aspects of the disclosure, a mobile device includes an index associating a key item with screen capture images determined to include the key item via recognition, each screen capture image having an associated application state identifier. The application state identifier includes a target task component associated with a mobile application executing at the time the image is captured and a sub-task component related to a user-interface active in the mobile application at the time the image is captured. The mobile device also includes at least one processor, an executing mobile application, and memory storing instructions that, when executed by the at least one processor, generate a user interface. The user interface may be configured to provide a search result from the index for key items responsive to a query and receive a selection of information related to the application state identifier. The selection causes the mobile device to transition to a state represented by the application state identifier, including opening the mobile application associated with the target task to the user-interface.

According to certain aspects of the disclosure, a method includes saving a selection of a first saved application state identifier and a selection a second saved application state identifier as a task flow in a memory on a mobile device and activating the task flow in response to a first command from a user of the mobile device. Activating the task flow can include opening a first mobile application associated with a target task in the first saved application state identifier to a user-interface corresponding to a sub-task component of the first saved application state identifier and opening, in response to receiving a second command from the user, a second mobile application associated with a target task in the second saved application state identifier to a user-interface corresponding to a sub-task component of the second saved application state identifier.

According to certain aspects of the disclosure, a mobile application state identifier includes a protocol identifier, a target task component associated with a mobile application executing when the application state identifier is generated and a sub-task component related to a user-interface active in the mobile application when the application state identifier is generated. The application state identifier can also include a user input component reflecting actions taken by a user during execution of the mobile application. The application state identifier can also include a device state component. Data items in each component may be ordered from generic to specific.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for capturing, sharing, and recreating a state of a mobile device.

One or more of the implementations of the subject matter described herein can be implemented so as to realize one or more of the following advantages. As one example, the application state identifier need not be device or mobile application specific. Putting general information ahead of more specific information allows a more general state to be shared regardless of differences between a target and source device. As another example, the application state identifier enhances collaboration when two people are communicating, as one person is able to share the state of their device with another without having to explain to the other how to navigate to the information. Such collaboration is especially valuable when the second recipient of the state is in a hands-free environment and unable to operate common user interfaces. As another example, the application state identifier enables a user to easily preserve context while switching mobile devices, so that no additional user input is needed to pick up on one device where the user left off on another device. The application state identifier also makes it easier to return to a particular state. As another example, activation of a state represented by an application state identifier is different from recording and paying back actions in the form of a macro. Such macros are device- and application user-interface dependent. Consequently, slight variations in the on-screen presentation cause a macro to fail. In contrast, the application state identifier can set up a general state or specific state, for example by setting environment variables, prior to launching a mobile application associated with a target task. As another example, the application state identifier has a hierarchical information scheme that lends itself to organizing, comparing, and clustering, which may be useful in analyzing workflow represented by saved application state identifiers. In other words, the saved application state identifiers may represent a work flow and may be used, over time, to determine patterns and predict a next action based on historical work flow. As another example, the application state identifier enables "deep links" into an application. Because the application state identifier can capture the state reached by interacting with an application (or set of applications) in performing a task, when the system activates the state represented by the application state identifier, the user is taken directly to a given state in a mobile application, rather than to the mobile app's launch screen as an example.

The details of one or more implementations are set forth in the accompanying drawings and the description below. Other features will be apparent from the description and drawings, and from the claims.

BRIEF DESCRIPTION OF DRAWINGS

FIG. 2 illustrates example application state identifiers, in accordance with the disclosed subject matter.

Like reference symbols in the various drawings indicate like elements.

DETAILED DESCRIPTION

Figure 1:
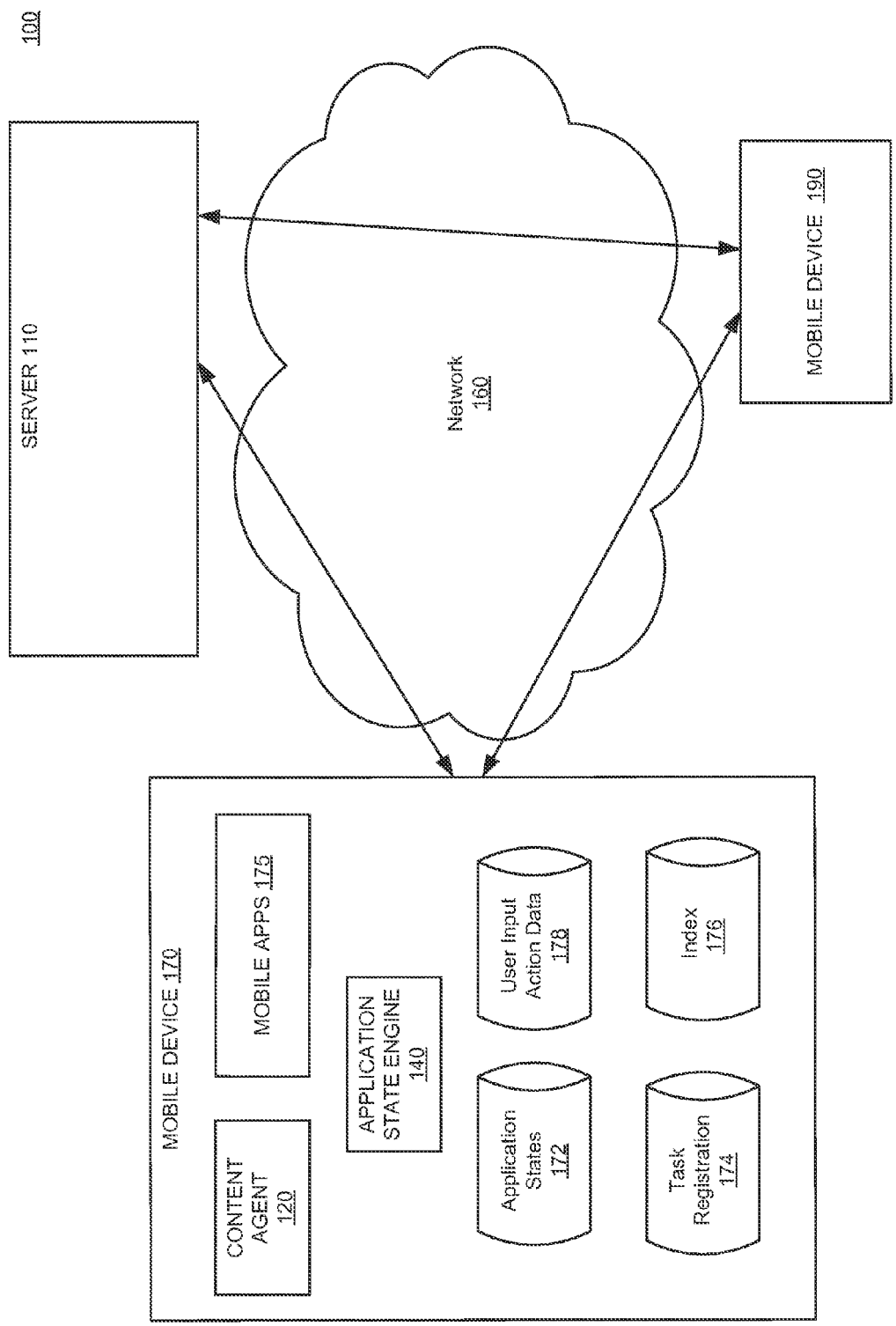
FIG. 1 is a block diagram illustrating an example system in accordance with the disclosed subject matter.

FIG. 1 is a block diagram of an application state sharing system 100 in accordance with an example implementation. The system 100 may be used to capture a state of a mobile device using an application state identifier and to share the state with another mobile device or recall the state at a later time. A state of a mobile device represents the currently active mobile application and the specific activity occurring within the active application. For example, in an email mobile application, the compose activity may be active rather than a reading activity. The state may be represented by a collection of variable-value bindings. A state may be general or specific. For example, the most general state represents the type of mobile application currently active or executing. Another general state may represent the type of the mobile application currently executing and a specific user-interface element within that application. A more specific state may include user-supplied text or selections (e.g., an item selected from a drop-down). Such selections can be represented by environment variables, such as a variable-value binding. The state can also include information about the mobile device settings and environment, such as location, power settings, etc. The system 100 in FIG. 1 is a client-server system, with some data processing potentially occurring at a server 110. However, other configurations and applications may be used. For example, the data processing may occur exclusively on the mobile device 170. In some implementations, a user of the mobile device 170 may indicate that portions of the processing be performed at the server 110. Thus, implementations are not limited to the exact configurations illustrated.

Figure 6:
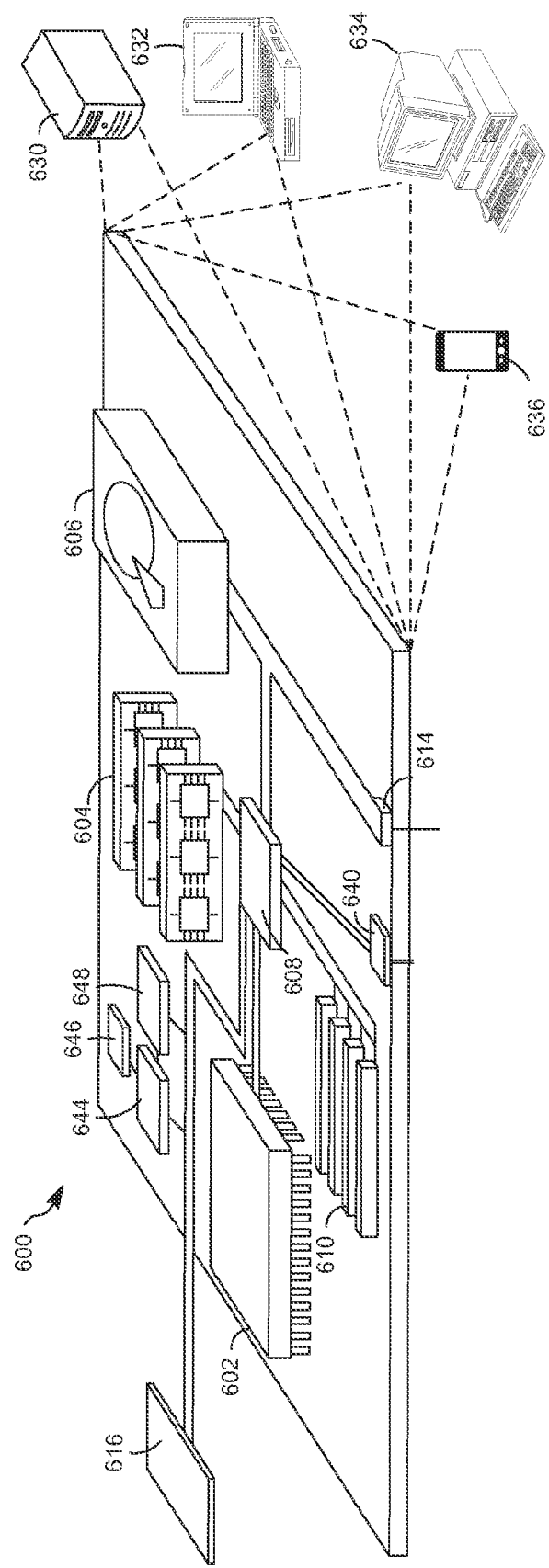
FIG. 6 shows an example of a computer device that can be used to implement the described techniques.

The application state sharing system 100 may include mobile device 170. Mobile device 170 may be any mobile personal computing device, such as a smartphone or other handheld computing device, a tablet, a smart watch or other wearable computing device, etc., that operates in a closed mobile environment rather than a conventional open web-based environment. Mobile device 170 may be an example of computer device 600, as depicted in FIG. 6. Mobile device 170 may include one or more processors formed in a substrate configured to execute one or more machine executable instructions or pieces of software, firmware, or a combination thereof. The mobile device 170 may include an operating system and one or more computer memories configured to store one or more pieces of data, either temporarily, permanently, semi-permanently, or a combination thereof. The mobile device 170 may thus include applications, including mobile applications 175, content agent 120, and application state engine 140, which represent machine executable instructions in the form of software, firmware, or a combination thereof. The mobile device 170 may also include one or more output devices, which may include a display device for displaying visual content and speakers for presenting audio content.

Conventionally, mobile applications, such as mobile applications 175, operate in a closed environment, meaning that the user employs separate applications to perform activities conventionally performed in a web-based browser environment. For example, rather than going to hotels.com to book a hotel or opentable.com to make a reservation, a user of the mobile device 170 can use a mobile application provided by hotels.com or opentable.com respectively. Some mobile applications may be installed by a user of the mobile device 170 and some may be installed by a manufacturer of the mobile device 170. When a mobile application 175 is installed, it may register as an application that handles one or more tasks. For example, a mobile application may register as handling map tasks, restaurant tasks, email tasks, social media tasks, news tasks, etc. In some implementations, the mobile device 170 may include a task registration 174 data store. The task registration 174 data store may associate a mobile application 175 with one or more tasks. If a user installs multiple mobile applications 175 that register for the same task, the mobile device 170 may select one of the mobile applications 175 as the default, or a user of the mobile device 170 may select one of the mobile applications 175 as the default application for the task.

The mobile device 170 may also include an application state engine 140. The application state engine 140 may be one of the mobile applications 175, may be provided by the operating system of the mobile device 170, may be included in content agent 120, may be included in one or more of the mobile applications 175, or a combination of these. For example, the content agent 120 may include or may use an application state engine 140 and one or more of the mobile applications 175 may include an application state engine 140. In some implementations, the application state engine 140 may capture the state of the mobile device 170 in the form of an application state identifier at the request of a user. For example, a user of the mobile device 170 may provide input, such as a particular swipe pattern, voice command, or menu command, that causes the application state engine 140 to generate an application state identifier for the current state of the mobile device 170. In some implementations, the content agent 120 may capture the state of the mobile device 170 at intervals.

The application state engine 140 may also generate a user interface that enables the user to identify a user and/or mobile device to send a captured state to. In addition or alternatively, the application state engine 140 may generate a user interface that allows the user to provide a description of the captured state and store the generated application state identifier with the description in a non-transitory data store, such as application states 172. Additional information, such as a device identifier and time stamp may be stored with the description and application state identifier. In some implementations, a screen capture image taken from the display of the mobile device, for example by copying the contents of the frame buffer, may be stored with one or more of the states stored in the application states 172. Such an image may be helpful for a user attempting to find a previous state.

In some implementations, the application state engine 140 may capture the state of the mobile device at predetermined intervals, for example every half second, every second, every five seconds, etc. The saved states, in the form of application state identifiers, may be stored in application states 172 and/or index 176. As explained above, additional information such as a screen capture, date/time stamp, etc. may also be stored with the captured state. In some implementations, the mobile device 170 (or the server 110) may perform recognition on the screen capture image associated with the state and may generate an inverted index, such as index 176, to assist in searching for a saved state, for example using keywords recognized in the screen capture image associated with the application state identifier. In some implementations, the application state engine 140 may filter the states saved in application states 172 to limit the quantity of states in application states 172 and/or the number of entries provided to index 176.

The application state engine 140 may also provide a user interface that enables the user to search stored states. The user interface provided by application state engine 140 may be searchable by a description, if one is provided by the user, or by content recognized in an image of the screen captured when the application state identifier is generated, by date and/or time, etc. The application states 172 data store may be indexed or otherwise searchable and/or the application state identifiers may be included in index 176. The user interface provided by the application state engine 140 may enable the user to recreate or activate the selected state on the mobile device 170 or to send the selected state to another mobile device, such as mobile device 190. The application state engine 140 may, in other words, be able to interpret a received or selected application state identifier and use it to change the current state of the mobile device 170 to a state represented by the received application state identifier. Mobile device 190 may also include an application state engine 140 that, after receiving an application state identifier from mobile device 170, activates the received state on the mobile device 190. In other words, the application state engine 140 on mobile device 190 changes the current state of the mobile device 190 to a state represented by the received application state identifier. In some implementations, the application state engine 140 may remove any personal information from an application state identifier before sending the application state identifier to a mobile device that is not associated with the user of the mobile device 170. Thus, the application state engine 140 may enable a user of the mobile device 170 to share personal state information with the user's own devices and to share non-personal state information with all other devices.

In some implementations, the mobile device 170 may include content agent 120. The content agent 120 may be configured to capture the current screen, e.g. by copying or reading the contents of the device's frame buffer, and capture the state of the mobile device at intervals. The interval can be small, for example every half second or every second. In some implementations, the content agent 120 may be configured to capture the screen and the state every time a touch event occurs, e.g., every time the user touches the screen to scroll, zoom, click a link etc. In some implementations, the content agent 120 may increase the interval at which the state and the screen are captured when the screen does not change. In other words, when the screen content is static, the content agent 120 may initiate a capture less often. The content agent 120 may store the captured state and the captured image in application states 172. In some implementations, the content agent 120 may provide the captured state, in the form of an application state identifier, and the screen capture image and metadata to a recognition and indexing engine (not shown), which may be on the mobile device 170 or a server, such as server 110. The indexing engine may identify and index key items (e.g., logos, terms, phrases, entities, images), identified in the screen capture image and store this information in index 176.

The index 176 may be an inverted index that stores key items and lists of images and/or application state identifiers associated with the key items. The key items may be text, entities, logos, locations, etc. discovered during recognition. The index 176 may also include metadata about each state or image, such as a rank for the key item for the state or image, coordinates in the image where the key item can be found, etc. In some implementations, the user may specify how long a particular state or screen capture image is kept in the index 176. In some implementations, the inverted index stores key items and lists of images, and the state is included in metadata for the image. Other metadata stored with the screen capture image may include the timestamp, the mobile device type, a mobile device identifier, the mobile application running when the screen was captured, e.g., the application that generated the screen, etc. Of course it is understood that the index 176 may be stored on a separate device, such as server 110.

The content agent 120 may also be configured to capture user input action data 178. User input action data 178 represents user input actions such as taps, swipes, text input, or any other action the user takes to interact with the mobile device 170. The user input action data 178 may record a timestamp for each action that indicates when the action occurred. The user input action data 178 may also record the screen coordinates for a touch action, beginning and ending coordinates for a swipe action, and the text entered for keyboard actions. If the user performs a multiple finger action, the user input action data 178 may include multiple entries with the same timestamp. For example if the user "pinches" with two fingers to zoom out, the content agent 120 may record one entry in the user input action data 178 for the first (e.g., index finger) digit and a second entry in the user input action data 178 for the second (e.g., thumb) digit, each having the same timestamp. The user input action data 178 may be used to generate a user-input component of an application state identifier. The user input action data 178 may be indexed by timestamp or stored in timestamp order.

The user of the mobile device 170 may control when the content agent 120 is active. For example, the user may specify that the content agent 120 is active only when other specified mobile applications 175 or mobile applications 175 associated with a specific task are running (e.g., only when in a social media mobile application). The user may also manually turn the content agent 120 on and off, for example via a settings application or other user interface. In some implementations, the user may turn the capture of user input data on and off independently of turning the screen and state capture functionality off.

The application state sharing system 100 may also include data stores associated with a user account or profile. Although illustrated in FIG. 1 as residing on the mobile device 170, the application states 172, the task registration 174, index 176, and user input action data 178 data stores may reside on the server 110, on the mobile device 170, a combination of the server and the mobile device, or in another location specified by the user. Thus, implementations are not limited to the exact configuration illustrated in FIG. 1. The data stores may be stored on any non-transitory memory.

Figure 7:
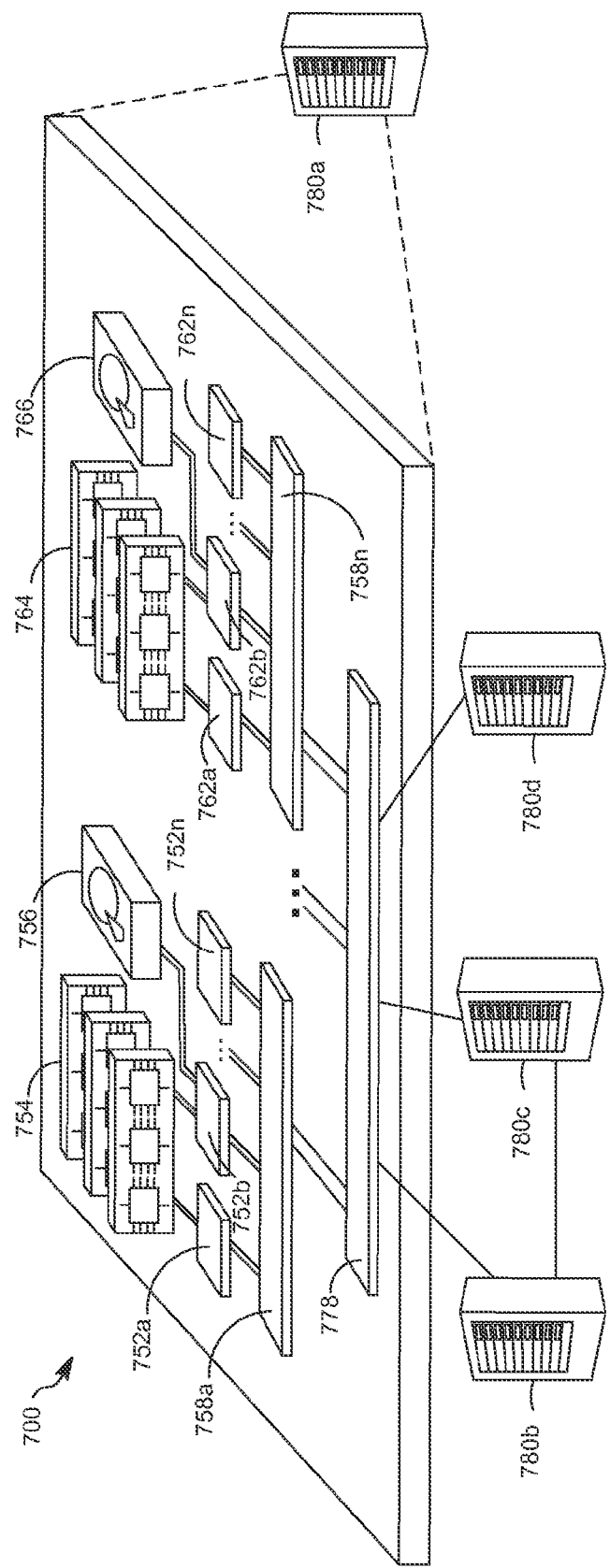
FIG. 7 shows an example of a distributed computer device that can be used to implement the described techniques.

The application state sharing system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 600, as depicted in FIG. 6, or computer device 700, as depicted in FIG. 7. Server 110 may include one or more processors formed in a substrate configured to execute one or more machine executable instructions or pieces of software, firmware, or a combination thereof. The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules that, when executed by the one or more processors, perform certain operations. In some implementations, the modules may be stored in an external storage device and loaded into the memory of server 110. For example, the server 110 may include modules for text recognition, image recognition, logo recognition, entity recognition, index generation and maintenance, etc.

The mobile device 170 may be in communication with the server 110 and with other mobile devices 190 over network 160. Network 160 may be, for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the server 110 may communicate with and transmit data to/from mobile device 170 and mobile device 190, and mobile device 170 may communicate with other mobile devices 190.

The application state sharing system 100 represents one example configuration and implementations may incorporate other configurations. For example, some implementations may combine one or more of the components of the application state engine 140 and the content agent 120 into a single module or engine, one or more of the components of the application state engine 140 and the content agent 120 may be performed by the server 110. As another example one or more of the data stores, such as application states 172, task registration 174, index 176, and user input action data 178 may be combined into a single data store or may be stored in an account associated with the user of mobile device 170 on a distributed computing device, such as server 110.

To the extent that the application state sharing system 100 collects and stores user-specific data or may make use of personal information, the user may be provided with an opportunity to control whether programs or features collect the user information (e.g., information about a user's social network, social actions or activities, user input actions, contacts, a user's preferences, or a user's current location), or to control whether and/or how to receive content that may be more relevant to the user. In addition, certain data may be treated in one or more ways before it is stored or used, so that personally identifiable information is removed. For example, a user's identity or user-specific information may be treated so that no personal or personally identifiable information can be determined for the user, or a user's geographic location may be generalized where location information is obtained (such as to a city, ZIP code, or state level), so that a particular location of a user cannot be determined. Thus, the user may have control over how information is collected about the user and used by an application state sharing system 100.

FIG. 2 illustrates example application state identifiers, in accordance with the disclosed subject matter. The application state identifiers capture information about the state of a mobile device in a specified format so that the state can be shared with another device or recalled at a later point in time. The format of the various components of the application state identifier may take various forms, as illustrated in the three examples of FIG. 2. For example, the various components may be separated by predefined characters, as illustrated by application state identifier 200 and 201, or may be a paired list, as illustrated by application state identifier 202. However, to effectively communicate a state between mobile devices, the format may be standardized so that various mobile devices from various manufacturers are able to identify and interpret the components of the application state identifier.

The application state identifiers 200, 201, and 202 include a prefix 205 that indicates the structure that follows is an application state transfer protocol using an application state identifier. The prefix 205 is not limited to the formats illustrated, but could be any combination of characters that is used by a mobile device to identify the following characters as an application state identifier. For example, the prefix 205 of application state identifier 200 is "asi://" while the prefix 205 for the application state identifier 202 is "astp://". The prefix 205 may not be considered a component of the application state identifier, as it may be considered only a signal of the presence of such an identifier.

A first component of the application state identifier is the target task 210. The target task 210 identifies the type of mobile application executing when the application state identifier is generated. Naming a target task rather than a mobile application that is running provides the ability to transfer the state from one mobile device to another mobile device even if the second mobile device does not have the same mobile application installed. Thus, the target task lets the mobile device that is activating the state represented by the application state identifier choose the appropriate mobile application to execute. Examples of target tasks include calendar, social media, Short Message Service (SMS) or text communication, email, maps, browser, etc. A mobile application may be associated with one or more target tasks on the mobile device. If two installed mobile applications are associated with the same target task, a user of the mobile device may select one as the default for handling application state identifiers associated with the task or the mobile device may select a default or one at random.

The second component of the application state identifier is the sub-task 215. The sub-task 215 is specific to the target task 210, and may represent a user-interface component for the target task. A user-interface component may be a data item common for the type of target task. For example, a calendar target task may have a date component that represents the date the user is looking at. As another example, a map task may have an address, e.g., city or street, component. The user-interface component may also be a common interface for a task. For example, email tasks have a compose message user-interface and an inbox user-interface. As another example, reservation applications have a review user-interface and a create reservation user-interface. Such user-interface components are not specific to one particular mobile application but generally common to all mobile applications associated with the target task. In some implementations, the sub-task 215 component may include application-specific data items. Such specific sub-task data items may follow the general sub-task data items. Thus, if a recipient device of a shared state is not able to process a data item in the sub-task 215, the receiving device may ignore any remaining data items in the sub-task 215, but may use the more general data items that preceded it. In some implementations, the sub-task 215 component may represent environment variables that are not based on user-input. Such environment variables may be generated by the mobile application and captured as data items in the sub-task 215 component. As indicated above, data items for general environment variables, e.g., common to the target task, may be placed ahead of data items for more specific environment variables, e.g., for a specific mobile application.

The application state identifier may have a user input 220 component. The user input 220 may be user specific, application specific or may be general to a user-interface component. The general data items in the user input 220 component may appear ahead of more specific data items. Any personal data items may be stored last in the user input 220 component. For example, a compose email sub-task commonly requires the user to identify the recipient of the email. The input from the user identifying the recipient may be captured, e.g., by the mobile application, by a content agent, or by the operating system, and be included as part of the application state identifier. Such user input is general to the sub-task of composing email. Conversely, email applications may have different menu selections and the user input 220 component may reflect user selection of a specific menu option. This type of user input may be application specific. In some implementations, particular menu selections may be captured via environment variables. In some implementations, such input may be captured via a content agent. The system may use the user input 220 component to deep-link into the mobile application when the state the application state identifier is activated. For example, the application state identifier may indicate that within user interface identified by the sub-task, the user clicked an {expand} button, as illustrated by application state identifier 201. Alternatively, the user input may include text characters, for example typed into a search box, and select a {go} button. The text and the selection of the {go} button may be captured, e.g. from an environment variable or as user input data, and provided with the application state identifier. Any personal information may be encrypted in the application state identifier. In some implementations, such personal information may be marked or delineated separately from other information in the user input 220 component.

The application state identifier may also include other information, such as device information 225. The device information 225 may encode a mobile device type, a location of the mobile device, a mobile device identifier, which applications were active, ambient light, motion of the device, device pose, font preferences, screen brightness, screen orientation, etc. Such information may assist in re-creating the device state represented by the application state identifier, especially when the state is activated on the same device or a target device of the same type. In addition, the application state identifier can use variables, such as 'currentLoc' that are dependent on one or more settings or attributes of the device. The device information 225 may also enable a destination device to correctly interpret any user input action data that is dependent on screen coordinates using information such as screen size and screen resolution of the sending device.

As indicated above, the application state identifier may be general or specific. The more components an application state identifier has, the more specific the identifier is. A general identifier may include the target task 210 and a sub-task 215 component. These portions of the application state identifier may generally be interpreted by and activated on any mobile device. Any application-specific data items in sub-task 215 may be excluded or, may be disregarded by the recipient mobile device, e.g., the device with which the application state identifier is shared. The user input 220 component may include general, specific, or even personal data items. For example, a search term entered into a search box may be general for a restaurant application, but the controls selected by a user may be specific to a particular application. Thus some of the user input 220 in an application state identifier may work only with a particular mobile application, e.g., one expecting a certain user interface. In some implementations, the user input 220 component may include personal data items, e.g., data items unique to a user. Such data items may enable a user to resume a previous state on the mobile device, or to share a state between devices owned by the user, but may be removed or anonymized if the application state identifier is shared with another user, e.g. a device not associated with the user. In some implementations, such personal data items may be tagged as personal in the application state identifier. Thus, personal information may be easily identified and removed or anonymized when an application state identifier is shared with a device not associated with the user. While specific data items enable deep linking into a particular mobile application, such deep linking may be successful on a limited number of mobile devices (e.g., those running the particular application). Therefore, more general data items in the application state identifiers may be successfully used to share a less-specific state more often.

Figure 3:
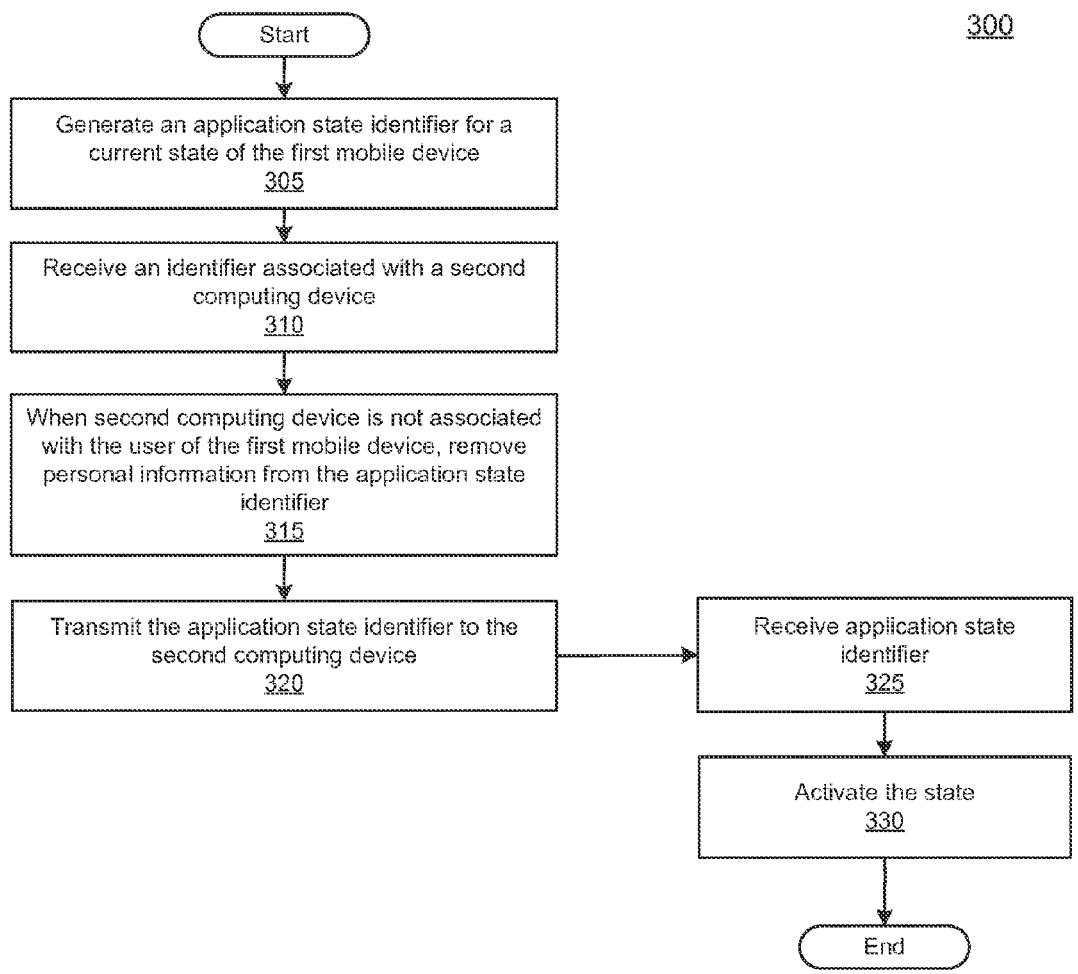
FIG. 3 illustrates a flow diagram of an example process for sharing a state of a first mobile device with a second mobile device using an application state transfer protocol, in accordance with disclosed implementations.

FIG. 3 illustrates a flow diagram of an example process 300 for sharing a state of a first mobile device with a second mobile device using an application state transfer protocol, in accordance with disclosed implementations. Process 300 may be performed by an application state sharing system, such as system 100 of FIG. 1. Process 300 may be used to capture a state of the first mobile device and share that state with a second mobile device. For example, Bob and Alice may be planning to meet for dinner. Bob may be in his office and Alice may be driving, e.g., using a hands-free Bluetooth device. Bob may look up a restaurant on his mobile device and, once they decide on a restaurant, may find the location of the restaurant in a map application. Because Alice is driving she cannot look up the address on her mobile device, so Bob activates a command (e.g., a swipe pattern, a menu option, a voice command) that shares the state on his mobile device and sends the state to Alice's device. The state is represented by an application state identifier. When Alice's device receives the application state identifier, it may interpret the components and activate the state, thus changing the state on Alice's device so that a map application installed on Alice's device opens to the address that Bob was viewing on his device. Thus, Alice is able to begin using the map application without having to input any information. This occurs whether Alice and Bob have similar mobile devices or devices running different operating system and different map applications.

Process 300 may include generating an application state identifier for the current state of the first mobile device (305). Generating the application state identifier may include identifying the mobile application running and determining a target task associated with the application. If the mobile application is associated with two or more target tasks, the system may select a target task based on the current user interface active in the mobile application, for example. Generating the application state identifier may also include determining a user-interface component active at the time the application state identifier is generated. In some implementations, the first mobile device may capture environment information or variables. Environment information includes variables and their values set by the operating system and the mobile application that is executing. The environment information may include sub-task information and user input information. Generating the application state identifier may include determining the applicability of various environment variables and including data items for more general variables ahead of data items for more specific variables in the application state identifier. In some implementations generating the application state identifier may also include gathering and encoding device data.

In some implementations, generation of the application state identifier may be initiated by an express command from a user on a first mobile device. The command may be a swipe or tap pattern, a menu option, a control, or some other command means for receiving the intent of the user. In some implementations, the mobile application may provide the command means. In some implementations, the operating system may provide the command means. Such an express command may also cause display of a user interface that enables the user of the first mobile device to provide an identifier associated with a second mobile device. In some implementations, generation of the application state identifier may occur on a regular basis, for example at some interval determined by a content agent. In such implementations, the user may provide an express command to share the current state and the system may use the most recently generated application state identifier as the current state and initiate display of a user interface to receive an identifier for a second mobile device.

The first mobile device may thus receive an identifier associated with a second computing device (310). The identifier may be a user account name that is associated with a device or a device identifier. For example, the user of the first mobile device may select a contact via a phone number, SMS identifier, video chat identifier, etc. As another example, the user of the first mobile device may input a phone number (that is not associated with a contact), a network identifier (e.g., a device connected via a home wireless network), select an identifier for a device it detects within a certain distance, etc. The device identifier supplied may depend on the user interface provided to the user of the first mobile device. The identifier may also be a user account at a server. For example, the first mobile device may share a state of a user's first mobile device with a user's second mobile device via a server. Thus, for example, the application state identifier may be sent to a user account at a server and may be transmitted to a second mobile device when the user logs in from the second mobile device.

The first mobile device may determine if the second computing device is associated with the user of the first mobile device and, when it is not associated with the user, may remove personal information from the application state identifier (315). For example, if the user of the first mobile device selects a contact, the first mobile device may determine that the second computing device is not associated with the user of the first mobile device. As another example, when the second computing device is a user account at a server, the first mobile device may determine the second computing device is associated with the user. As indicated above, the personal information may be identified in the user-input component using a predetermined delimiter or tag. In some implementations, removing the personal information may include removing the user input component and portions of the device component of the application state identifier.

The first mobile device may transmit the application state identifier to the second computing device (320). This may be accomplished, for example, using conventional communication techniques. When the second computing device is a server, the system may transmit the application state identifier to a second mobile device when the user logs in on the second mobile device. The second mobile device may receive the application state identifier (325) and may use the application state identifier to automatically activate the state represented by the application state identifier on the second mobile device (330). Activating the state includes determining which mobile application handles the target task and determining which user interface component of that mobile application corresponds with the sub-task component. In some implementations, the second mobile device may set up environment variables that correspond to the data items in the application state identifier and start the mobile application selected based on the target task. In some implementations, if the second mobile device cannot interpret a data item it may skip or ignore the data item. This may occur, for example, when the mobile application selected on the second mobile device differs from the mobile application running when the application state identifier was generated on the first mobile device. Activating the state may also include replaying any actions represented by a user input component of the application state identifier; if any particular action is not available, the second mobile device may stop the playback. In some implementations, when the application state identifier includes a device component, the second mobile device may adjust device settings as appropriate as part of activating the state. Process 300 then ends, having transferred the state of the first mobile device to the second mobile device.

It is understood that in some implementations, any computing device may generate an application state identifier and share the identifier with a mobile device. For example, a user using yelp.com may select a control on the web page that causes the yelp.com browser page to generate a general application state identifier that corresponds to the information displayed in the browser. Such a general application state identifier may include information that can be interpreted by a reservation application on a mobile device, for example. Thus, if a developer of the web page offers such functionality, the application state identifier received by the mobile device may not have originated from a mobile device, but from a corresponding web page programmed to mimic the environment on a mobile device. For example, server 110 of FIG. 1 may include a web page having such functionality. In this manner, a web page at a server may provide a deep link into a mobile application. Thus, generation of the application state identifier may be performed on any computing device rather than a first mobile device, with the target task, sub-task, and user input components hard-coded (e.g., predetermined) rather than based on an executing mobile application.

Figure 4:
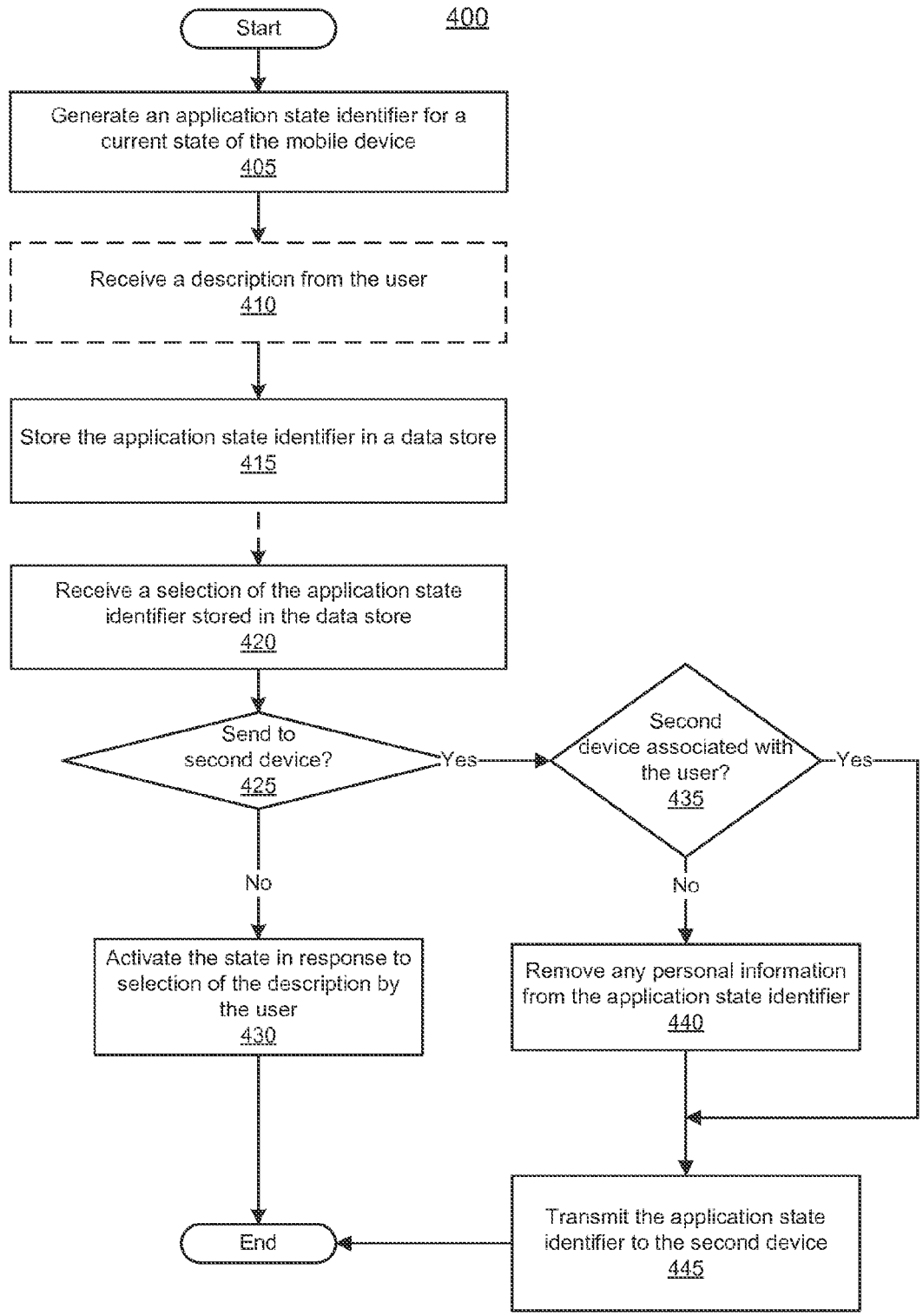
FIG. 4 illustrates a flow diagram of an example process for recalling a saved state using an application state identifier, in accordance with the disclosed subject matter.

FIG. 4 illustrates a flow diagram of an example process 400 for recalling a saved state using an application state identifier, in accordance with the disclosed subject matter. Process 400 may be performed by an application state sharing system, such as system 100 of FIG. 1. Process 400 may be used to capture a state of a mobile device and store the state for recall at a later time. When the state is recalled, the user may share that state with a second mobile device or may activate the state on the same mobile device. For example, Jack may use a tablet to perform a complex task, for example adjusting the settings for the device. The task may involve navigating multiple user interfaces and Jack realizes he may not remember how to reach the particular user interface again. In some implementations, Jack may activate a command (e.g., as explained above with regard to FIG. 3) to the capture of the state on his tablet using an application state identifier. Jack may be provided with a user interface that allows him to provide a description or identifier for the state. In some implementations, the state may be automatically stored and may be indexed according to the content on the screen when the application state identifier is generated. In some implementations, a screen capture image of the display of the tablet may also be stored with the description and the state. This information can be stored on his tablet or in a user account at a server, where Jack can access it from multiple devices. At a later date, Jack may find this application state identifier, either using the description or the indexed content, and may activate it on his tablet or other device. Jack may also share the state with someone else, allowing them to find the user interface Jack found.

Process 400 begins with the generation of an application state identifier for a current state of the mobile device (405). The system may also capture other metadata with the application state identifier, such as a screen capture image of the display. As discussed above, the application state identifier may be generated automatically by the mobile device or may be generated in response to an express command by the user of the mobile device. If generated by an express command, in some implementations the system may receive a description of the state from the user (410). Such a description may enable the user to more easily locate the state in the future. The system may store the application state identifier in a data store (410). The data store may store the application state identifier with the description entered by the user. The data store may also be an index that associates key items with the application state identifier. In some implementations, the application state identifier may be associated with a screen capture image, which the system performs recognition on (either at the mobile device or at a server) to identify the key items. Thus, an application state identifier may be located based on a search for items found in the screen capture image using the index. In some implementations, the data store may be local to the mobile device. In some implementations, the data store may be at a server, stored in a user-account associated with the user.

At some later time, the user may search for the application state identifier in a user interface, and may select the application state identifier stored in the data store (420). For example, the system may provide a user interface that enables a user to search via a query for a previously saved state. The query may be directed towards a data and time, the provided description, the key items recognized in a screen capture image associated with the application state identifier, or a combination of these, using conventional query techniques. The user interface may also enable the user to select a second device to share the state with (425). If the user does not select or identify a second device (425, No), the system may activate the state represented by the selected application state identifier on the mobile device (430). This may include interpretation of the application state identifier as described above with regard to FIG. 3. Process 400 then ends, having activated a previous state on the mobile device with minimal user input.

When the user selects or identifies a second device (425, yes), the system may determine whether the second device is associated with the user, e.g., the user that selected the application state identifier (435). If the second device is not associated with the user (435, No), the system may remove or anonymize any personal information in the application state identifier (440) and then transmit the modified application state identifier to the second device (445). If the second device is associated with the user (435, Yes), the system proceeds to transmitting the application state identifier to the second device (445), as above. The second device may interpret the application state identifier and activate the state, as described above. As indicated above, the second device may be a user account associated with a server or may be a second mobile device. Process 400 then ends, have shared a previously captured state with another device.

In some implementations, the user may generate a task flow using previously captured application states. For example, the user may select two or more saved applications states and select them as a task flow. The user may provide a description for the task flow. The user may later recall the saved task flow, which includes two or more application state identifiers. The system may activate the state represented by the first application state identifier in the selected task flow. In some implementations, the user may provide additional input after the state represented by the first application state identifier has been activated. The user may then provide a command or indication to the device to activate the state represented by the second application state identifier. For example, if the user often buys tickets to a movie and then makes a reservation to a restaurant, the user may combine a state representing movies showing at a particular theatre with a state representing reservations at a particular restaurant into one task flow. When the user activates the task flow, the device will open the movie ticket application and the user need only select the movie to buy the tickets for. After completing this task, the user activates the second state, and provides the date for the reservation. The task flow thus accomplishes both tasks while minimizing user input actions (e.g., the user does not need to navigate to the application, select a theater, select a date, etc. and then navigate to the restaurant application, navigate to the restaurant, etc.). Grouping saved application state identifiers into a task flow, the user may create complex tasks and accomplish them with minimal input. The user may share the task flow with others or with a user account on a server, similar to sharing a single application state identifier.

Figure 5:
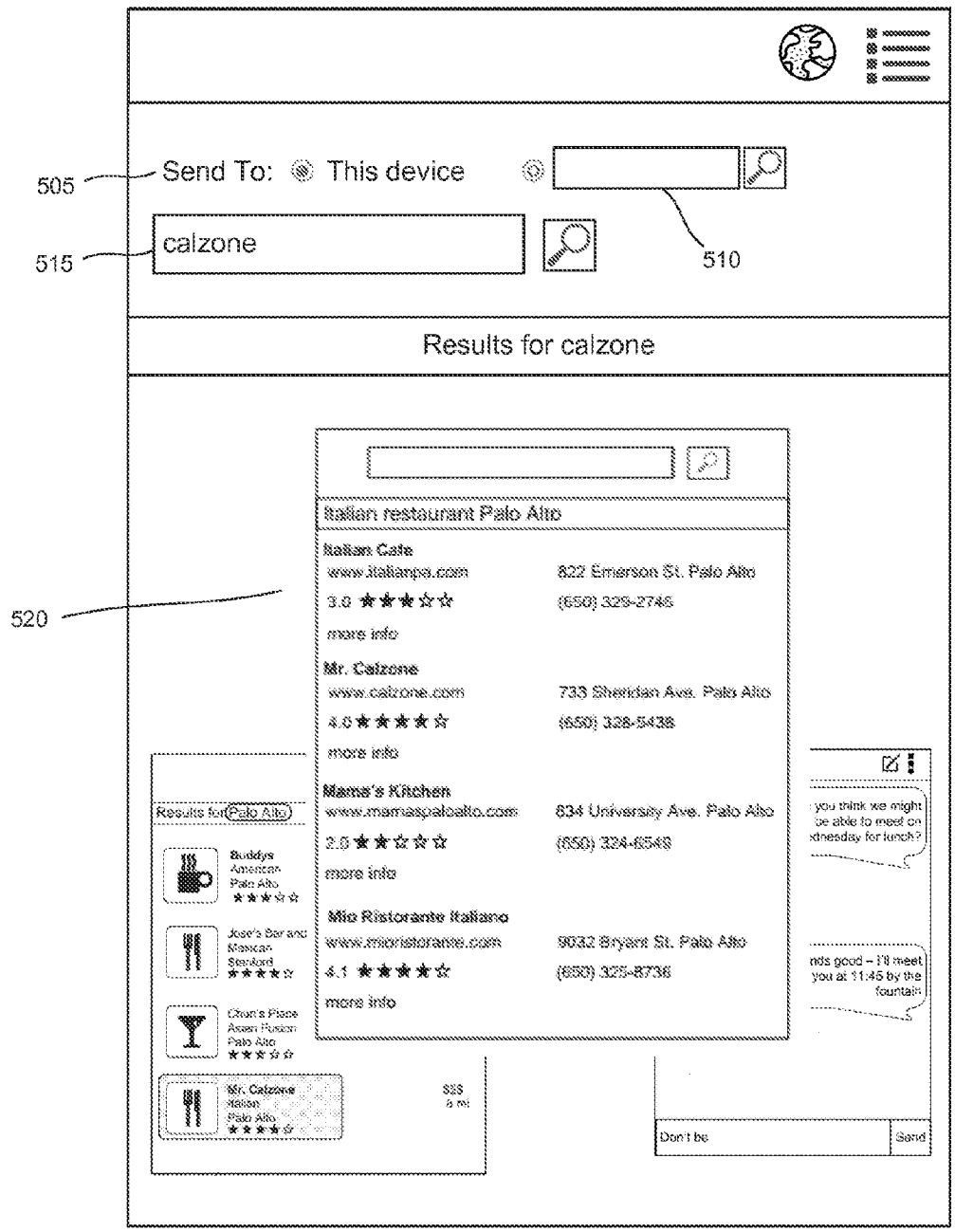
FIG. 5 illustrates an example user interface for selecting saved application states, in accordance with the disclosed subject matter.

FIG. 5 illustrates an example user interface 500 for selecting saved application states, in accordance with disclosed implementations. An application state sharing system, such as system 100 of FIG. 1, may access an application state data store, such as application states 172 or index 176, in response to a query to produce the user interface 500. The user interface 500 may include controls 505 for selecting a mobile device on which to activate the selected application state identifier. For example, the controls 505 may enable the user of a mobile device to select the mobile device as the recipient or destination device. Thus, selection of a saved application state may result in the mobile device returning to the state represented by the selected application state identifier. The user may also search for other mobile devices, for example via control 510. The control 510 may search contacts, may accept a device identifier (e.g., a phone number or other device identifier), may search for nearby mobile devices, may accept a user account identifier, etc. When a second mobile device is selected, selection of an application state identifier may result in transmission of the application state identifier to the second mobile device. The second mobile device may, upon receipt of the transmitted application state identifier, transition to the state represented by the received application state identifier, including opening a mobile application associated with the target task to a user interface identified in the sub-task component of the application state identifier. In some implementations, a second mobile device may download a shared application state identifier when the user logs in to the server from the second mobile device.

User interface 500 also may include a control 515 for searching the application state data store. In the example of FIG. 5, the application state data store is an index that associates key items with an application state identifier and a screen capture image captured when the application state identifier was generated. The key items may be text, logos, places, or entities identified in the screen capture image. In other implementations, the user may have provided a description of the state that can be indexed. In addition, the control 515 may search for application state identifiers that were generated on a particular day or during a particular date range. In some implementations, key items may be taken from the application state identifier itself, for example the target task and text entered by a user may be key items.

The user interface 500 may also include a search results area 520. The user interface 500 may display search results in search results area 520. In some implementations, the search results may be portions of the screen capture images associated with responsive key items. The portion may include the whole image, or a smaller part of the image that surrounds the key item. The search results area 520 is illustrated as a carousel of images, but it is understood that the search results area 520 may include a tiled list, a bulleted list and may not include images. For example, the search results may list the application state identifier with a date/time stamp or description. Selection of one of the search results may be considered to be selection of the application state identifier associated with the search result. In the example of user interface 500, selection of the search result may be accomplished via a touch of the image at the center of search result area 520. Such a selection is considered selection of the application state identifier associated with the image in the application state data store. A user may use the user interface 500 to select a previously saved application state in order to reactivate the saved state on the mobile device, to transfer the saved state to another device associated with the user, or to share the saved state with another mobile device.

FIG. 6 shows an example of a generic computer device 600, which may be operated as system 100, and/or client 170 of FIG. 1, which may be used with the techniques described here. Computing device 600 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a computing device, such as a laptop computer 632, personal computer 634, or tablet/smart phone 636. An entire system may be made up of multiple computing devices 600 communicating with each other. Other configurations are possible.

FIG. 7 shows an example of a generic computer device 700, which may be system 100 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

According to certain aspects of the disclosure, a mobile device includes an application state data store, at least one processor, an executing mobile application, and memory storing instructions that, when executed by the at least one processor, cause the mobile device to perform operations. The operations may include generating an application state identifier that represents a state of the mobile device, the application state identifier including a target task component associated with the mobile application and a sub-task component related to a user-interface active in the mobile application at the time the application state identifier is generated. The operations may also include storing the application state identifier in the application state data store, receiving an indication from the user selecting the application state identifier after exiting the mobile application, and activating the state represented by the application state identifier, including opening the mobile application to the user-interface.

These and other aspects can include one or more of the following features. For example, the application state identifier may further include a user input component that represents actions taken by the user to arrive at the state represented by the application state identifier and/or a device state component. As another example, the operations may also include capturing an image of a display of the mobile device at the time the application state identifier is generated and associating the image with the application state identifier in the data store. As another example, the operations may also include receiving a selection of a second mobile device from the user and transmitting the application state identifier to the second mobile device, wherein the second mobile device opens a mobile application associated with the target task to a user-interface corresponding to the sub-task component in response to receiving the application state identifier. In such implementations, the application state identifier can further include a user input component and the operations may also include determining whether the second mobile device is associated with the user and removing at least a portion of the user input component responsive to determining the second mobile device is not associated with the user.

As another example, the operations may include capturing an image of a display of the mobile device at the time the application state identifier is generated, performing recognition on the image to identify a key item in the image, and associating the key item with the image and the application state identifier in the data store. In such an implementation, receiving the indication from the user can include receiving a query that includes the key item, presenting at least a portion of the image to the user in response to the query, and receiving a selection of the portion of the image. As another example, generating the sub-task component includes capturing environment variables of the mobile application and activating the state may include setting up environment variables using information in the sub-task component.

According to certain aspects of the disclosure, a method includes generating, on a first mobile device, an application state identifier. The application state identifier can include a target task component associated with a mobile application executing on the mobile device at the time of the generating and a sub-task component related to a user-interface component active in the mobile application at the time of the generating. The method may also include transmitting the application state identifier to a second mobile device, wherein the second mobile device opens a mobile application associated with the target task to a user-interface corresponding to the sub-task component in response to receiving the application state identifier.

These and other aspects can include one or more of the following features. For example, the application state identifier can further include a user-input component that represents actions taken by the user to arrive at the state represented by the application state identifier. In such an implementation, the sub-task component and the user-input component may include generic data positioned ahead of specific data and/or the method may also include determining that the second mobile device is not associated with the user and removing at least a portion of the user-input component prior to transmitting the application state identifier in response to the determining. As another example, the method may also include capturing an image of a screen displayed when the application state identifier is generated, storing the image with the application state identifier in a data store, and receiving a selection of at least a portion of the image prior to transmitting the application state identifier. As another example, the method can also include capturing an image of a screen displayed when the application state identifier is generated, performing recognition on the image to identify a key item in the image, associating the image and the application identifier with the key item in an index, providing the application state identifier and at least a portion of the image in response to a query having the key item, and receiving a selection of the application state identifier prior to transmitting the application state identifier.

As another example, the method may include generating the application state identifier in response to a command to share the state of the mobile device. In another example, the method may include receiving a command to share the state of the mobile device and selecting the application state identifier as a most recent application state identifier in an application state data store. As another example, the mobile application on the first mobile device can differ from the mobile application on the second mobile device.

According to certain aspects of the disclosure, a mobile device includes an index associating a key item with screen capture images determined to include the key item via recognition, each screen capture image having an associated application state identifier. The application state identifier includes a target task component associated with a mobile application executing at the time the image is captured and a sub-task component related to a user-interface active in the mobile application at the time the image is captured. The mobile device also includes at least one processor, an executing mobile application, and memory storing instructions that, when executed by the at least one processor, generate a user interface. The user interface may be configured to provide a search result from the index for key items responsive to a query and receive a selection of information related to the application state identifier. The selection causes the mobile device to transition to a state represented by the application state identifier, including opening the mobile application associated with the target task to the user-interface.

These and other aspects can include one or more of the following features. For example, the user interface may be further configured to receive a selection of the mobile device or a second mobile device, wherein the selection causes the mobile device to transition when the mobile device is selected and wherein the selection causes the mobile device to transmit the application state identifier to the second mobile device when the second mobile device is selected. As another example, the user interface may be further configured to remove a portion of a user interface component of the application state identifier when the second mobile device is not associated with the user.

According to certain aspects of the disclosure, a method includes saving a selection of a first saved application state identifier and a selection a second saved application state identifier as a task flow in a memory on a mobile device and activating the task flow in response to a first command from a user of the mobile device. Activating the task flow can include opening a first mobile application associated with a target task in the first saved application state identifier to a user-interface corresponding to a sub-task component of the first saved application state identifier and opening, in response to receiving a second command from the user, a second mobile application associated with a target task in the second saved application state identifier to a user-interface corresponding to a sub-task component of the second saved application state identifier.

According to certain aspects of the disclosure, a mobile application state identifier includes a protocol identifier, a target task component associated with a mobile application executing when the application state identifier is generated and a sub-task component related to a user-interface active in the mobile application when the application state identifier is generated. The application state identifier can also include a user input component reflecting actions taken by a user during execution of the mobile application. The application state identifier can also include a device state component. Data items in each component may be ordered from generic to specific.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
an application state data store;
at least one processor;
a first mobile application executing on the mobile device; and
memory storing instructions that, when executed by the at least one processor, cause the mobile device to:
generate a first application state identifier that represents a state of the mobile device, the application state identifier being a string of characters in a standardized format, the standardized format including:
a prefix identifying the string of characters as an application state transfer protocol,
a target task component that follows the prefix, the target task component identifying a type of a mobile application executing at the time the application state identifier is generated, the type enabling transfer of the state to a different mobile application, and
a sub-task component that follows the prefix, the sub-task component relating to a user-interface active in the mobile application at the time the application state identifier is generated, wherein in the sub-task component, data items and respective values common to the type identified by the target task component appear ahead of any data items and respective values specific to the executing mobile application,
store the first application state identifier in the application state data store,
receive a second application state identifier from a second mobile device after exiting the mobile application, the second application state identifier being a string of characters in the standardized format, the second application state identifier being generated by a second mobile application that is a different mobile application than the first mobile application and the second mobile application being of the same type as the first mobile application, and
in response to recognition of the prefix of the second application state identifier, activate the state represented by the second application state identifier, including choosing the first mobile application based on the type identified by the target task component of the second application state identifier, and opening the first mobile application to a user-interface corresponding to a sub-task component of the second application state identifier using data items in the sub-task component, wherein the mobile device is configured to disregard remaining data items in the sub-task component after failing to interpret a data item in the sub-task component.

2. The mobile device of claim 1, wherein the standardized format further includes:
a user input component that follows the sub-task component, the user input component representing actions taken by the user to arrive at the state represented by the first application state identifier.

3. The mobile device of claim 1, wherein the standardized format further includes a device state component.

4. The mobile device of claim 1, wherein the memory further stores instructions that, when executed by the at least one processor, cause the mobile device to:

capture an image of a display of the mobile device at the time the first application state identifier is generated; and associate the image with the first application state identifier in the data store.

5. The mobile device of claim 1, wherein the memory further stores instructions that, when executed by the at least one processor, cause the mobile device to:

receive a selection of the second mobile device from the user; and transmit the first application state identifier to the second mobile device via a wireless communication channel, wherein the second mobile device chooses the second mobile application based on the type and opens the second mobile application to a user-interface corresponding to the sub-task component in response to receiving the application state identifier.

6. The mobile device of claim 5, wherein the standardized format further includes a user input component and the memory further stores instructions that, when executed by the at least one processor, cause the mobile device to:

determine whether the second mobile device is associated with the user; and remove at least a portion of the user input component responsive to determining the second mobile device is not associated with the user.

7. The mobile device of claim 1, wherein the memory further stores instructions that, when executed by the at least one processor, cause the mobile device to:

capture an image of a display of the mobile device at the time the first application state identifier is generated;

perform recognition on the image to identify a key item in the image; and associate the key item with the image and the first application state identifier in the data store.

8. The mobile device of claim 7, further comprising:

receiving a query that includes the key item;

presenting at least a portion of the image to the user in response to the query;

receiving a selection of the portion of the image; and activate a state represented by the first application state identifier.

9. The mobile device of claim 1, wherein generating the sub-task component includes:

capturing environment variables of the mobile application;

determining a first portion of the environment variables that are based on user-input and a second portion of the environment variables that are not based on user-input;

determining, from the second portion, environment variables that are task-specific, the task-specific environment variables being common to the type identified in the task component; and including the second portion of the environment variables in the sub-task component, the task-specific environment variables appearing ahead of the remainder of the environment variables in the second portion, wherein activating the state includes setting up environment variables using information in the sub-task component.

10. A method comprising:

generating, on a first mobile device, an application state identifier for a first application currently executing on the first mobile device, the application state identifier being a string of characters including:

a prefix identifying the remaining characters of the string of characters as an application state transfer protocol, a target task component identifying a type of mobile application executing on the mobile device at the time of the generating, the type enabling transfer of the state to a different mobile application, and a sub-task component that follows the prefix, the sub-task component relating to a user-interface component active in the first application at the time of the generating, wherein in the sub-task component, data items and respective values common to the type identified by the target task component appear ahead of any data items and respective values specific to the first application executing on the mobile device;

receiving an identifier for a second mobile device; and transmitting, via a wireless communication channel to the second mobile device, the application state identifier, wherein in response to recognition of the prefix, the second mobile device chooses a second mobile application of the type identified by the target task component and opens the second mobile application to a user-interface corresponding to the sub-task component using data items in the sub-task component in response to receiving the application state identifier, the second mobile application being a different mobile application than the first application, and the second mobile device being configured to disregard remaining data items in the sub-task component after failing to interpret a data item in the sub-task component.

11. The method of claim 10, the application state identifier further including:

a user-input component that represents actions taken by the user to arrive at the state represented by the application state identifier.

12. The method of claim 11, further comprising:

determining that the second mobile device is not associated with the user; and removing at least a portion of the user-input component prior to transmitting the application state identifier in response to the determining.

13. The method of claim 11, wherein the user-input component includes application-specific data items positioned ahead of user-specific data items in the application state identifier.

14. The method of claim 10, further comprising:

capturing an image of a screen displayed when the application state identifier is generated;

storing the image with the application state identifier in a data store; and receiving a selection of at least a portion of the image prior to transmitting the application state identifier.

15. The method of claim 10, further comprising:

capturing an image of a screen displayed when the application state identifier is generated;

performing recognition on the image to identify a key item in the image;

associating the image and the application identifier with the key item in an index;

providing the application state identifier and at least a portion of the image in response to a query having the key item; and receiving a selection of the application state identifier prior to transmitting the application state identifier.

16. The method of claim 10, further comprising:

generating the application state identifier in response to a command to share the state of the mobile device.

17. The method of claim 10, further comprising:
receiving a command to share the state of the mobile device; and
selecting the application state identifier as a most recent application state identifier in an application state data store.

18. The method of claim 10, wherein the data items in the sub-task component represent environment variables that are not based on user-input.

19. A mobile device comprising:
at least one processor;
an executing mobile application; and
memory storing instructions that, when executed by the at least one processor, generate a user interface configured to:
provide a search result from an index for key items responsive to a query, the index associating a key item with screen capture images determined to include the key item via recognition, each screen capture image having an associated application state identifier, the application state identifier being a string of characters that includes:
a prefix identifying the string of characters as an application state transfer protocol,
a target task component that follows the prefix, the target task component identifying a type of mobile application executing at the time the image is captured, the type enabling transfer of the state to a different mobile application, and
a sub-task component that follows the prefix, the sub-task component relating to a user-interface active in the mobile application at the time the image is captured, wherein in the sub-task component, data items and respective values common to the type identified by the target task component appear ahead of any data items and respective values specific to the executing mobile application,
receive a selection of information related to an application state identifier in the search result, and
in response to recognition of the prefix of the application state identifier corresponding to the selected information, transition to a state represented by the application state identifier, including choosing a second mobile application of the type identified by the target task component, wherein the second mobile application is a different mobile application than the mobile application executing at the time the application state identifier is generated, and opening the second mobile application to a user-interface corresponding to the sub-task component using data items in the sub-task component, wherein the mobile device is configured to disregard remaining data items in the sub-task component after failing to interpret a data item in the sub-task component.

20. The mobile device of claim 19, wherein the user interface is further configured to:
receive a selection of a second mobile device,
wherein when the second mobile device is the mobile device, the selection causes the mobile device to recognize the prefix and transition to the state represented by the application state identifier, and
wherein when the second mobile device is not the mobile device, the selection causes the mobile device to transmit the application state identifier to the second mobile device, wherein the second mobile device transitions, in response to recognition of the prefix, to a state represented by the transmitted application state identifier.

21. The mobile device of claim 20, wherein the user interface is further configured to:
remove a portion of a user interface component of the application state identifier prior to transmitting when the second mobile device is not associated with the user, so the state represented by the transmitted application state identifier is more general than the state represented by the application state identifier in the index.

\* \* \* \* \*